United States Patent [19]
Jensen

[11] 4,191,361
[45] Mar. 4, 1980

[54] LOCKBAR FOR FENCE POST MOUNTING

[75] Inventor: Hans P. Jensen, Copenhagen, Denmark

[73] Assignee: Julius Koch USA Inc., New Bedford, Mass.

[21] Appl. No.: 938,109

[22] Filed: Aug. 30, 1978

[51] Int. Cl.² .............................................. E04H 17/00
[52] U.S. Cl. ................................ 256/12.5; 24/243 K; 256/24
[58] Field of Search ............... 256/24, 12.5, 47, 52, 256/49; 160/135, 402, 403, 380; 24/243 K

[56] References Cited

U.S. PATENT DOCUMENTS

| | | | |
|---|---|---|---|
| 458,821 | 9/1891 | Brookbank | 256/56 |
| 573,512 | 12/1896 | Hearnshaw | 256/52 UX |
| 684,213 | 10/1901 | Fogelsong | 256/52 |
| 800,877 | 10/1905 | Pevoto | 256/52 |
| 1,345,136 | 6/1920 | Cowan | 24/243 K UX |
| 1,444,641 | 2/1923 | Rowe | 256/48 |
| 2,104,473 | 1/1938 | Watson | 24/243 K UX |
| 2,795,399 | 6/1957 | Anderson | 256/12.5 |
| 2,872,161 | 2/1959 | Olson | 256/12.5 X |
| 3,058,518 | 10/1962 | Housman | 160/402 X |
| 4,054,269 | 10/1977 | Stabler | 256/48 |

FOREIGN PATENT DOCUMENTS 719685  11/1966  Italy ........................... 24/243 K Primary Examiner—Andrew V. Kundrat
Attorney, Agent, or Firm—Dike, Bronstein, Roberts, Cushman & Pfund

[57] ABSTRACT

A lockbar for fastening a bight of fencing about a fence post or the like structure comprising an elongate sleeve having an interior cross-sectional configuration which is complementary to a portion of the fence post such as to enable telescopically sliding the sleeve onto such portion of the fence post over a bight of the fencing, said sleeve containing an opening at one side and being of such interior dimension as to bindingly accommodate the bight of fencing entering the opening at one side and leaving at the other side. An end of the lockbar is tapered to gather the fencing about the post as it is telescopically slid onto the fence post.

17 Claims, 17 Drawing Figures

LOCKBAR FOR FENCE POST MOUNTING

BACKGROUND OF INVENTION

There are numerous ways of attaching fencing material to posts, the most common being by fastening means in the form of nails, rivets, screws, bolts, wire, or straps. In stringing the fencing material, stretchers are used and as each section between posts is pulled taut, the fastening elements are driven into the post or wrapped about it, as the case may be. The aforesaid fastening means deteriorate rapidly due to stress, vibration, weathering and the like, and the anchoring is seldom firm enough to withstand snow and wind loading. A more durable system of attaching is with the air of lockbars comprised of non-corrosive metal material designed to be attached by bolts or screws or by means of clamps to the post over the fencing, the post being especially designed to have the lockbars attached thereto. The use of lockbars is expensive because not only do the lockbars themselves have to be specially prepared, but also the posts; is cumbersome and require time-consuming installation procedures. The attaching structures as herein described are designed to be durable, relatively inexpensive compared to the lockbars referred to above, easy to install and, beyond this, to impart tension to the section of fencing between posts as a result of the installation procedure. Further, the structures are adapted not only to attaching fencing to posts, but have a more general application in that they can be used very effectively for stretching and attaching substantially any kind of flexible webbing, screening, fabric, sheeting or the like to spaced structural members for various purposes, rapidly without the necessity for fasteners, tools or specialized skills on the part of the installer. Additionally, the structures are capable of being manufactured by conventional methods of extrusion, protrusion, casting, rolling and the like from metal, alloys of metal, plastics, and in a variety of sizes, shapes and heights inexpensively and rapidly.

SUMMARY OF INVENTION

As herein illustrated, the invention comprises lockbars for fastening flexible concatenated structure to spaced, parallel, elongate fixtures comprising elongate sleeves which have interior cross-sectional configurations complementary to exterior portions of the elongate fixtures such as to enable telescopically sliding the sleeves axially onto said fixtures about bights of the material of the flexible concatenated structure, wrapped around the fixtures, said sleeves containing openings along one longitudinal side and being of such interior dimension as to bindingly accommodate the thickness of the concatenated structure, entering the opening at one side, extending about the fixtures within the confines of the sleeve and leaving the opening at the other side. The elongate sleeves are of a length comparable to the length of the elongate fixtures and/or to the dimension of the flexible concatenated structure to be attached to the elongate fixtures. The flexible concatenated structure may be manufactured of coated natural fibers, synthetic fibers or wire and the elongate fixtures fence posts. To enable slidingly installing the lockbars over the ends of the posts and gathering in and tensioning the fencing about the posts, the elongate sleeves are tapered at one end.

The invention will now be described in greater detail with reference to the accompanying drawings, wherein.

Figure 1:
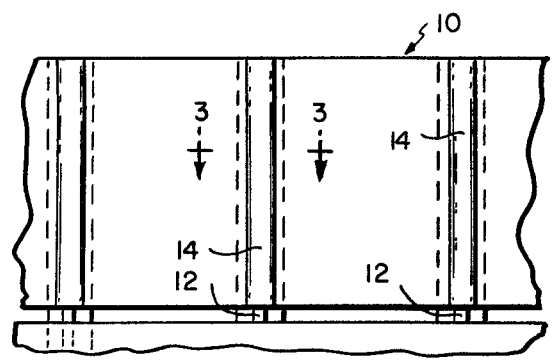
FIG. 1 is an elevation of a length of fence showing fence wire strung on spaced, parallel, upstanding posts by means of the lockbars of this invention.
Figure 2:
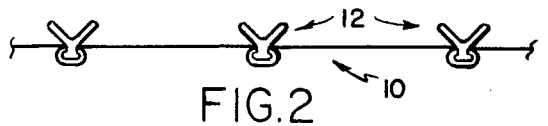
FIG. 2 is a top view of the fence section shown in FIG. 1.

Referring to the drawings, FIGS. 1 and 2 show a length of fencing 10 attached to spaced, parallel, vertically-disposed face posts 12 by means of lockbars 14 of this invention.

The fencing 10 can be of any suitable concatenated structure manufactured of coated natural fibers, synthetic fibers or wire and while illustrated herein as of a kind conventionally used to restrain livestock, farm animals and the like, it is within the scope of the invention to use the attaching means of this invention for a variety of purposes such as highway glare screening, wind screening, shelter screening, privacy fencing, commission control barriers, crowd control barriers, snowfencing, temporary athletic field fencing, multipurpose residential fencing, commercial fencing and the like. Still other purposes are to provide for attaching screening material in the form of fabrics, to furniture, side walls, roofs, ceilings and to use it for sound barriers, drying silos, shade cloth frames, awnings and the like. For each of the structures mentioned above, there would be substituted for fence posts appropriate structural elements or fixtures.

Figures 4, 5:
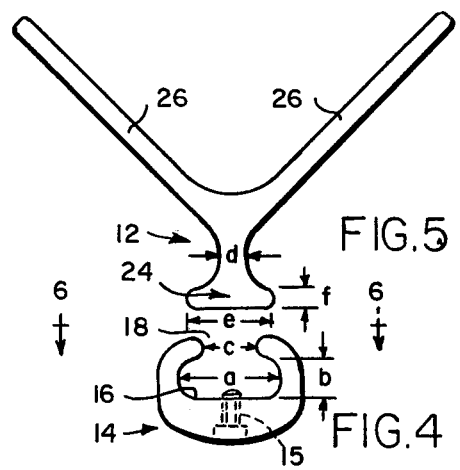
FIG. 4 is a plan view of one end of a lockbar showing preferred dimensions.
FIG. 5 is a plan view of an end of a fence post for which the lockbar of FIG. 4 is designed.
Figures 6, 7:
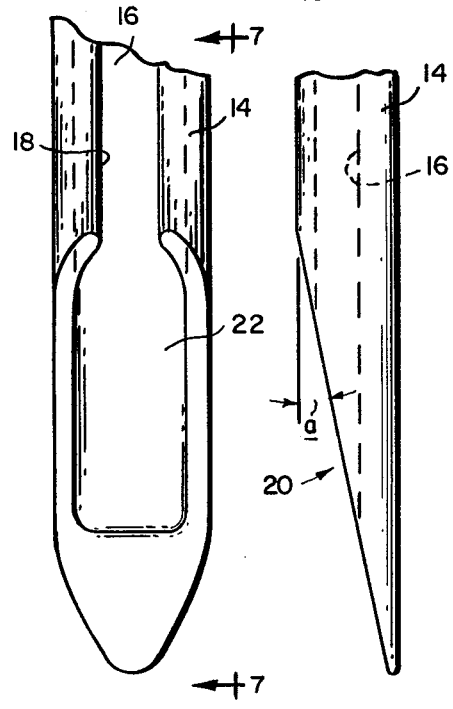
FIG. 6 is a fragmentary view of one end of the lockbar taken on the line 6—6 of FIG. 4.
FIG. 7 is a view taken on the line 7—7 of FIG. 6.
Figure 10:
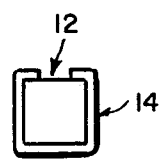
FIGS. 10 to 17 inclusive show alternate configurations for the supporting structure and lockbar.
Figure 11:
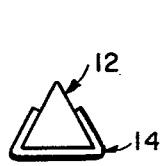
Figure 12:
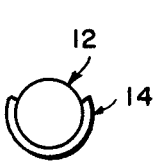
Figure 13:
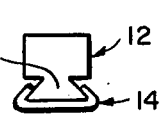
Figure 14:
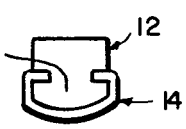
Figure 15:
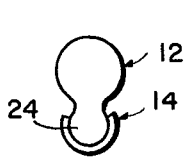
Figure 16:
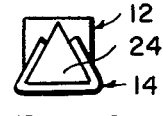
Figure 17:
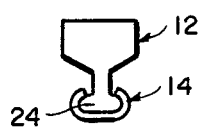

Referring specifically to the design of the structures for attaching fencing to fence posts, the lockbar 14, as shown in FIGS. 4, 6 and 7, is an elongate, rigid, sleeve-like member having internally thereof a longitudinal passage 16, the interior cross-sectional configuration of which is substantially rectangular and along one longitudinal side an opening 18. One end of the lockbar is tapered as shown at 20 and provided with an enlargement 22 of the opening 18. The angle a of the taper should be between approximately 15° and 60°.

Figure 3:
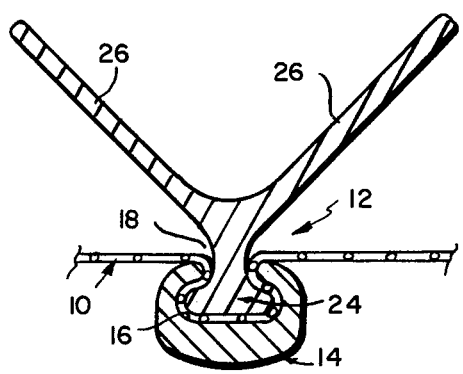
FIG. 3 is an enlarged right section of a fence post and lockbar showing a bight of the fencing locked by means of the lockbar to the fence post taken on the line 3—3 of FIG. 1.

The post 12 to which the fencing is to be attached with the aforesaid lockbar is provided with a longitudinally-extending rib 24 which is of an exterior horizontal cross-sectional configuration complementary to the interior cross-sectional configuration of the lockbar with a clearance between the interior of the lockbar and the exterior of the head for frictionally receiving and locking a bight 26 of the fencing which extends through the opening 18 at one side of the lockbar about the rib 24 and leaves the opening 18 at the other side. The rib 24, as illustrated in FIGS. 3 and 4, is of larger transverse dimension than that of the post 12 so that when the lockbar is telescoped over the upper end of the post, a substantial length of the fencing will be wrapped around the rib, thus taking up fencing from the sections of fencing between posts and thus tensioning and drawing the fencing taut between posts.

In the form of the invention as herein illustrated, the post 12 is provided at the side opposite the rib 24 with reinforcing anchoring wings 26—26 which may extend from top to bottom of the post or may be confined to the lower end of the post.

Figure 8:
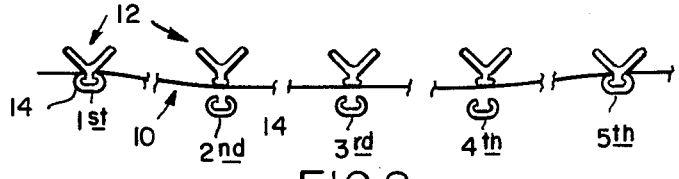
FIG. 8 illustrates the method of stringing fencing on posts with the lockbars of this invention.

The mode of erecting a fence with posts and lockbars as thus described is to first erect the posts 12 at suitable intervals, FIG. 8, and then fasten one end of a length of fencing to the first post in a series of posts by folding a bight of fencing about the rib of the post and then slipping the lockbar down over the bight of fencing to lock it to the posts. A length of fencing is now drawn from the first post over two or three posts, for example, to a fifth post, as shown in FIG. 8, with suitable stretching means, the length to be so stretched depending upon its weight, stiffness, etc. and a bight of the fencing is wrapped around the fifth post and a lockbar slipped over the end of the fifth post over the bight of fencing to lock it to the post. As previously explained, the slipping of the lockbar over the post, because it wraps the fencing about the rib, takes up a length of the fencing and, hence, takes up slack in the fencing between the first post and the fifth post. Now the installer goes back to the second post and slips a lockbar over the fencing so as to cause a bight of the fencing to become wrapped around the rib of the second post and then proceeds to the third post and does likewise. Each time that a lockbar is applied to a post, it takes up the fencing between posts and thus reduces the slack and applies tension to the sections of fencing between posts. The beveled ends of the lockbars automatically folds the fencing about the ribs of the posts as they are pushed dowardly on the posts.

The tension in the fencing normally pulls the lockbars outward relative to the posts so that there is sufficient frictional engagement between the lock bars and the ribs to prevent the lockbars from slipping downwardly on the posts. Under unusual stress, however, such as might be caused by high winds and snow loads which would counteract the tension developed by the fencing, the lockbars would slip down and, to prevent this, one or more set screws 15 are provided. Setting the inner ends of the set screws 15 against the ribs will hold the edges of the lockbar against the lobes of the ribs.

The interior cross section of the lockbar and the exterior configuration of the portion of the fence post to which the fencing is to be attached may take other forms besides that illustrated in FIGS. 1 to 7 inclusive, for example, they may have such cross-sectional configurations as shown in FIGS. 9 to 17.

Figure 9:
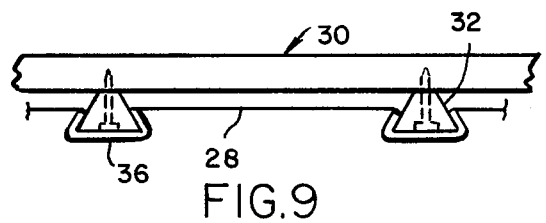
FIG. 9 is a fragmentary elevation of the use of lockbars of this invention for attaching flexible materials such as netting, canvas and the like to a ceiling or wall structure.

As previously stated, the lockbar which is herein illustrated and used in conjunction with a fence post for attaching fencing to fence posts is only one of many applications and can be used in various modified forms for attaching flexible material to provide for screening, barriers, shade cloths, awnings and the like. For example, as shown in FIG. 9, lockbars of the kind described may be used for suspending a ceiling 28 comprised of a web of textile fabric beneath the ceiling structure 30 of an auditorium. As shown, spaced, parallel structural elements 32 of triangular cross section are bolted to the underside of the longitudinal beam structure 30 and the ceiling 28 is attached to the structural elements 32 by means of lockbars 36 of complementary interior cross section. The lockbars enable easy replacement of the ceiling either purely from the standpoint of redecoration for a particular occasion or ease in replacement after it becomes worn or soiled.

The chief advantages of the aforesaid lockbar structure is that it facilitates installation, makes it possible for inexperienced persons without special instructions and without the aid of tools, stretching devices and the like, to install fencing or any of the other structures referred to. Further advantages are that the structure is capable of being manufactured of corrosion-resistant material at a relatively low cost by such conventional techniques as extruding, protruding, casting, rolling and so forth of a variety of materials which are resistant to corrosion, vibration, fracture, thus providing for long-term durability. The lockbars and posts can be protruded from Carsonite, an alloy of marble, glass, fiber and polymer, which yields a post which is as strong as comparable steel posts, yet substantially 75 percent lighter.

It is desirable that the clearace between the posts and the lockbars or other structural elements with which the lockbars are used should be approximately 5 millimeters; however, it is within the scope of the invention to vary the clearance depending upon the kind of fencing being used. Dimensions by way of example without limitation which prove to be suitable for attaching fencing constructed of textile materials to fence posts of the kind shown in FIGS. 3 to 7 inclusive provide that the interior transverse dimension a of the lockbar should be 20 millimeters, the front-to-back dimension b 10 millimeters, and the transverse width c of the opening 10 millimeters. The dimensions for the post comprise the transverse dimension d of the post per se 5 millimeters, the transverse dimension e of the rib 16 millimeters, and front-to-back dimension f of the rib 5 millimeters. The wings or fins 26—26 extend from the post per se at an angle of 90° to each other and are approximately 3.5 millimeters in thickness with a spread from the distal end of one of the distal end of the other of 75 millimeters. The overall depth of the post from front-to-back is approximately 50 millimeters.

The specific cross-sectional configuration of the lockbar as shown in FIGS. 1 to 7 is the only one of many possible shapes, the primary consideration being to provide a shape which particularly adapts itself to the kind of screening material used. A variety of possible cross-sectional shapes are shown in FIGS. 10 to 17 inclusive and these are considered to be wholly within the spirit and scope of the invention as herein described.

It should be understood that the present disclosure is for the purpose of illustration only and includes all modifications or improvements which fall within the scope of the appended claims.

I claim:

1. Lockbars for fastening flexible concatenated structures to spaced, parallel, elongate fixtures comprising elongate sleeves having interior cross-section configurations which are complementary to portions of the elongate fixtures such as to enable telescopically sliding the sleeves axially onto said fixtures, each sleeve containing an opening at one side and being of such interior dimension as to bindingly accommodate the bight of the concatenated structure entering the opening at one side, extending around the fixture within the confines of the sleeve and leaving the opening at the other side and being tapered at one end in a plane intersecting the side containing the opening.

2. A device according to claim 1 wherein the elongate fixtures are arranged to partition one area from another and said flexible concatenated structure is held taut between fixtures by said elongate sleeves.

3. A device according to claim 1 wherein said elongate sleeves are of a length corresponding to the length of the elongate fixtures.

4. A device according to claim 1 wherein the elongate sleeves are comparable in length to the dimension of the concatenated structure to be attached to the elongate fixtures.

5. A structure according to claim 1 wherein the sleeves contain means for locking them to the elongate fixtures.

6. A device according to claim 1 wherein the one end of the sleeve is tapered at an angle of between approximately 15° and 60°.

7. A lockbar for fastening fencing to fence posts, said lockbar comprising an elongate sleeve having interior cross-sectional configuration which is complementary to the exterior cross-sectional configuration of the fence post such as to telescopically receive the sleeve, said sleeve containing an opening longitudinally of one side and being of such internal dimensions as to bindingly accept a bight of the fencing entering the opening at one side, extending about the post confined within the sleeve and leaving the opening at the other side and being tapered at one end in a plane intersecting the side containing the opening.

8. A structure according to claim 7 wherein the sleeves correspond in length to the dimension of the fencing to be attached to the posts.

9. A structure according to claim 7 wherein the cross sections of the portions are substantially rectangular.

10. A structure according to claim 7 wherein the sleeve is tapered at an angle of between approximately 15° to 60°.

11. The method of stringing fencing comprising fixing fence posts in a line in the ground at appropriate intervals, attaching one end of a length of fencing to one of the posts with a sleeve designed to be telescoped onto the post over a bight of the fencing around the posts, said sleeve having a longitudinal slot therein through which the fencing enters at one side and leaves at the other; stretching a length of fencing along the line of posts, attaching the other end of the fencing to a post at the opposite end of the line of posts by telescoping a sleeve onto the post over a bight of the fencing around the post at that end and then successively attaching the portions of the fencing intermediate the two end posts to the posts intermediate the end posts by telescoping a sleeve over each of the intermediate posts so as to wrap a portion of the fencing at each post around the post.

12. A structure for stringing fencing comprising in combination fence posts having portions of predetermined cross-sectional configuration and lockbars in the form of elongate sleeves having interior cross-sectional configurations corresponding to the said portions of the fence posts to lock a bight of the fence wire at each post to the post and being tapered at one end in planes intersecting the sides containing the openings.

13. A structure for stringing fencing comprising in combination posts having ribs along one side of a predetermined exterior cross-sectional configuration and lockbars in the form of elongate sleeves having interior cross-sectional configurations complementary to the exterior configurations of said ribs, adapted to be telescopically engaged with the ribs to lock a bight of the fencing to each post about the rib to the post and being tapered at one end in the planes intersecting the sides containing the openings.

14. A structure according to claim 13 wherein the rib is of generally rectangular configuration.

15. A structure according to claim 13 wherein the rib is of generally circular configuration.

16. A structure according to claim 13 wherein the rib is of generally triangular configuration.

17. A structure according to claim 13 wherein the sleeves are tapered at an angle of between approximately 15° to 60°.

* * * * *